Oct. 18, 1932.  W. CAMERON  1,883,539
SOLDERING DEVICE FOR CAN MACHINES
Filed Sept. 24, 1930  7 Sheets-Sheet 1
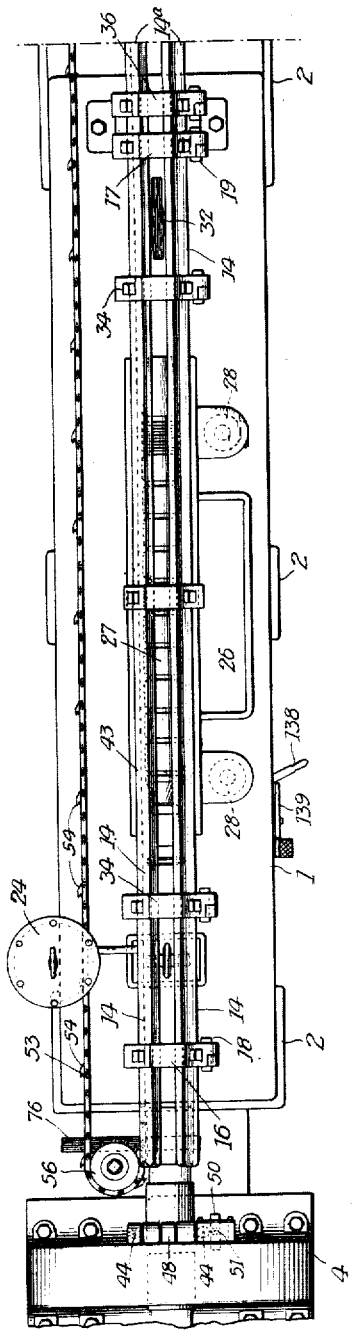
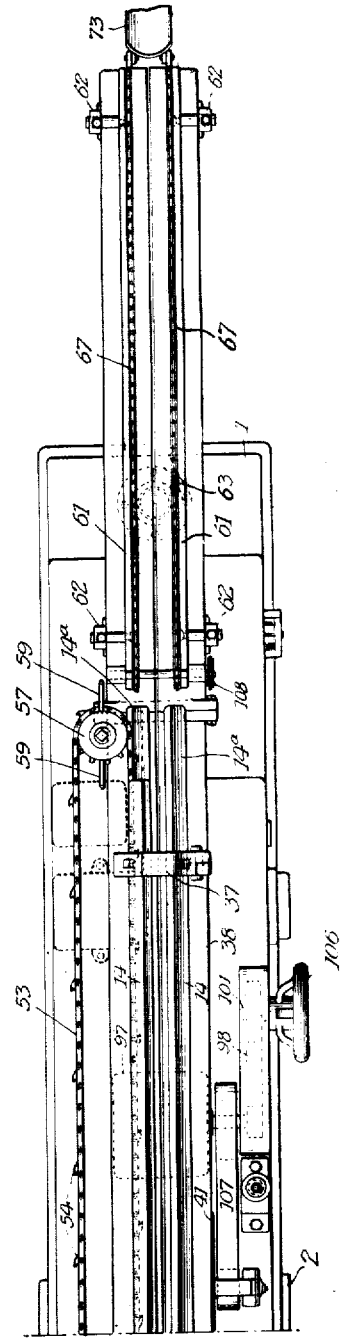
Inventor
William Cameron

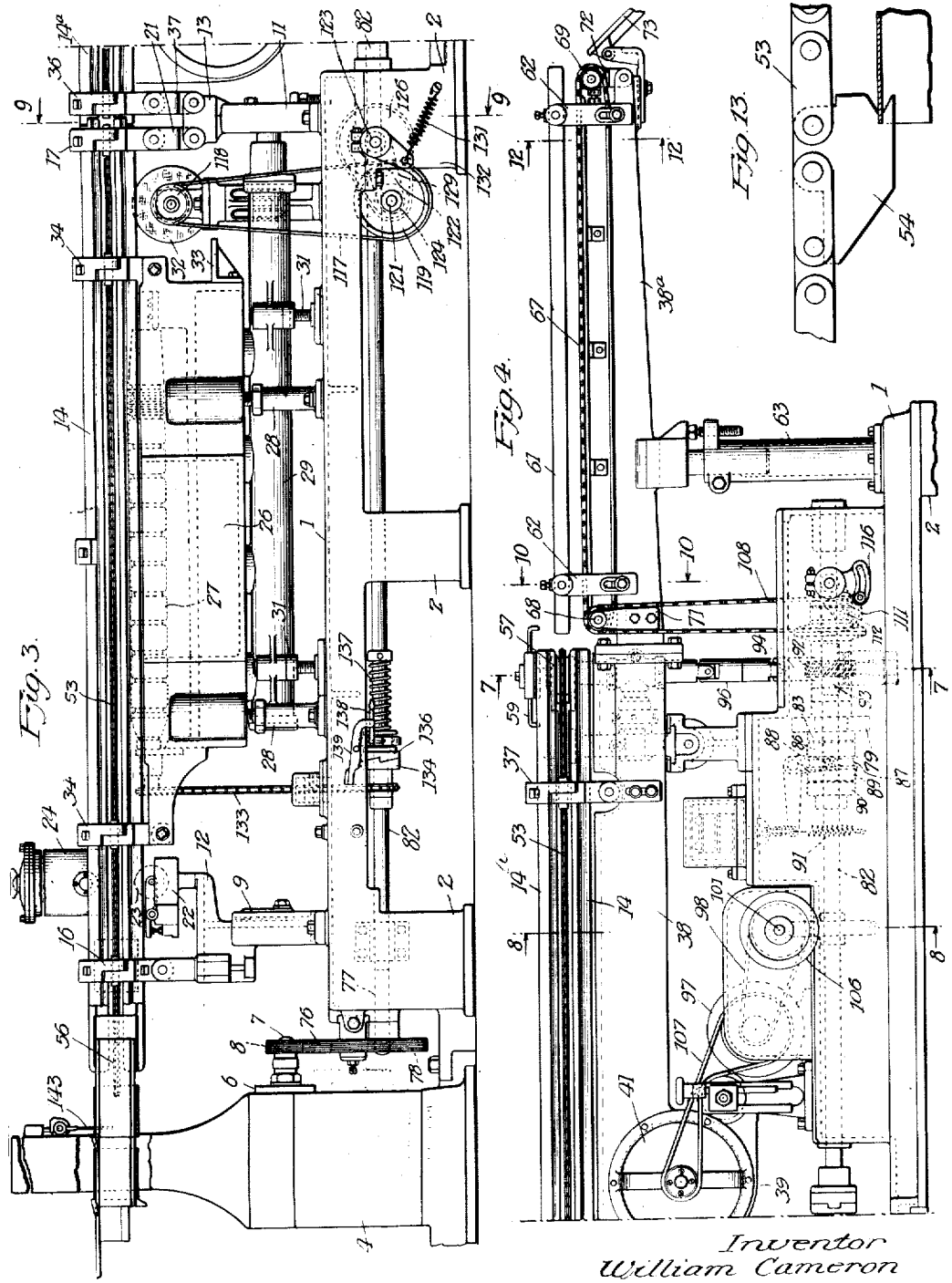

Oct. 18, 1932.  W. CAMERON  1,883,539
SOLDERING DEVICE FOR CAN MACHINES
Filed Sept. 24, 1930   7 Sheets-Sheet 3
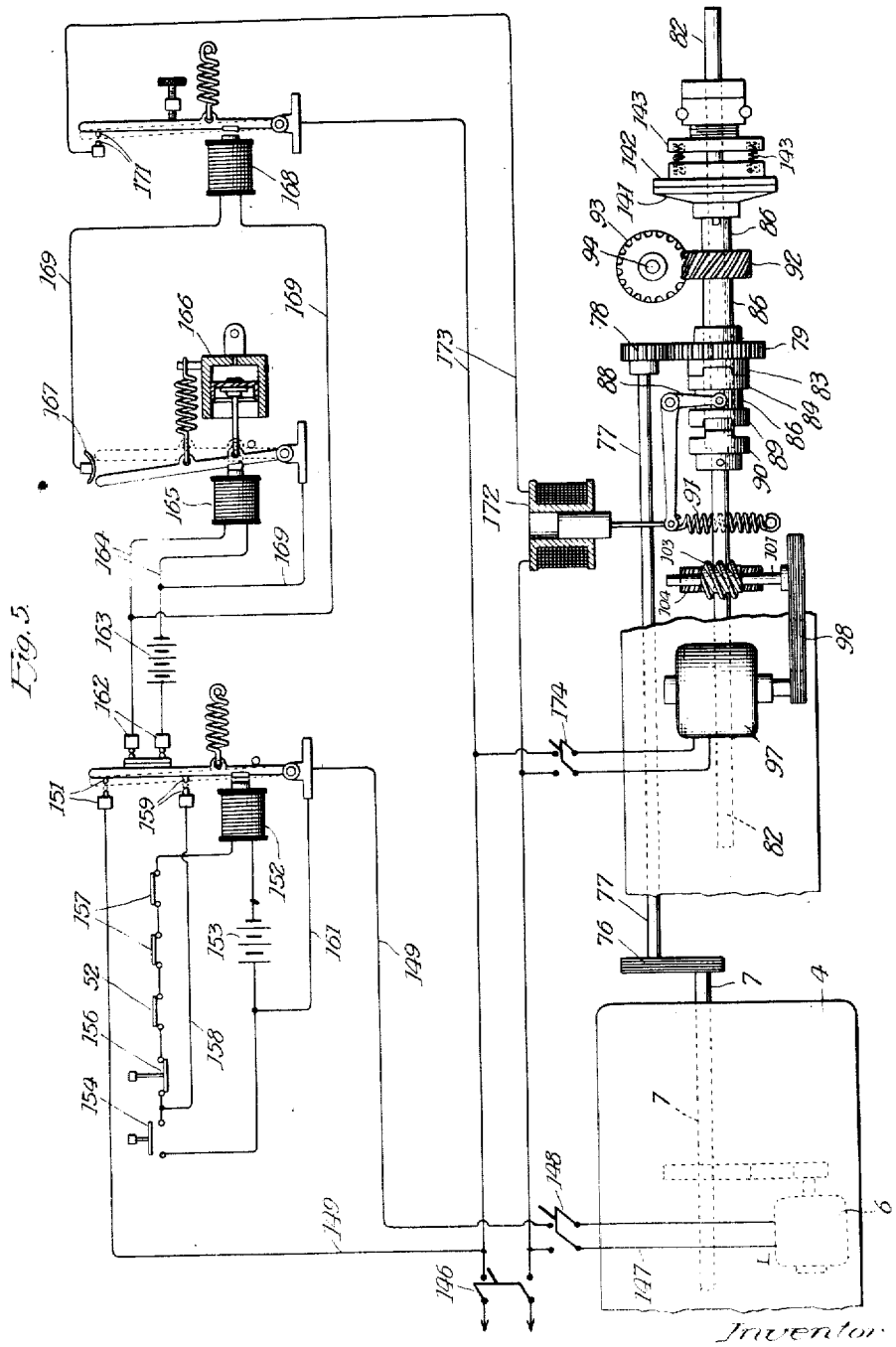
Inventor
William Cameron

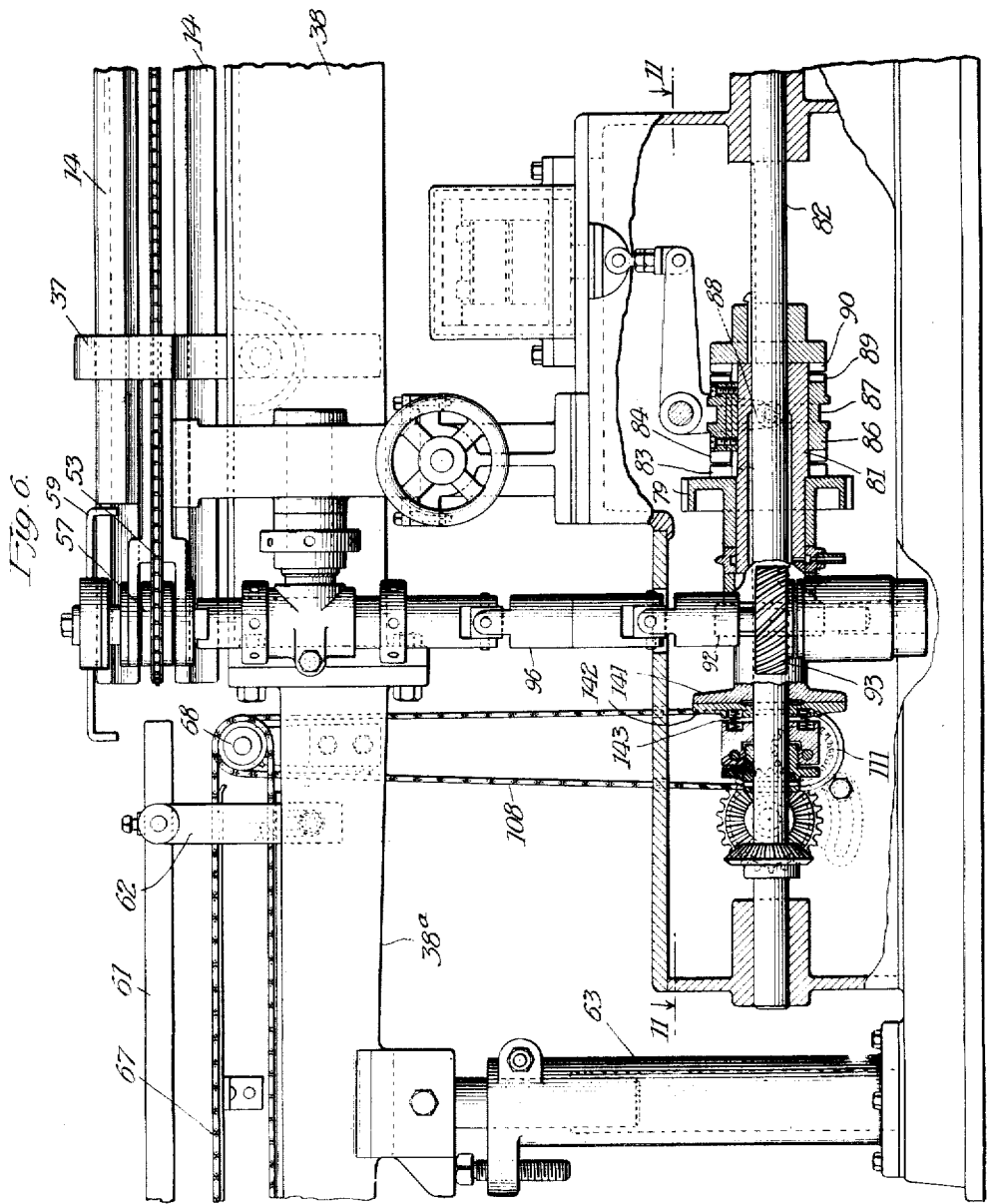

Oct. 18, 1932.  W. CAMERON  1,883,539
SOLDERING DEVICE FOR CAN MACHINES
Filed Sept. 24, 1930  7 Sheets-Sheet 5
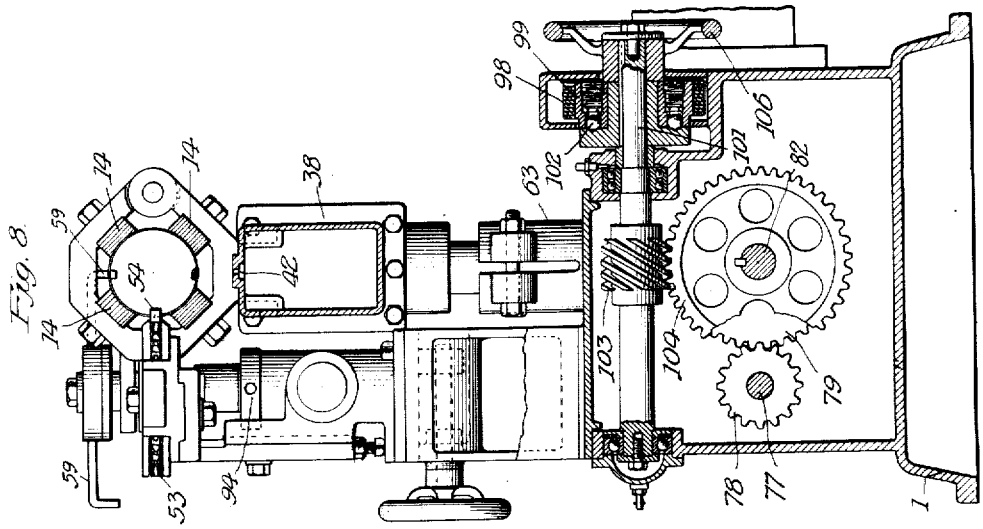
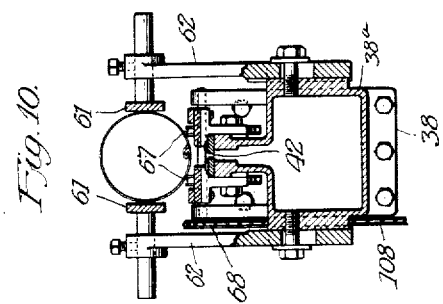
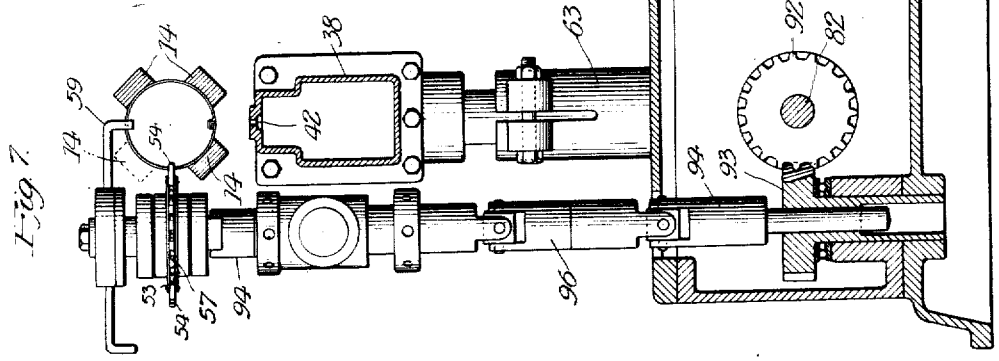
Inventor
William Cameron
Witness
R. B. Davison
By Wilson, Dowell, McCanna & Oehm
Attys.

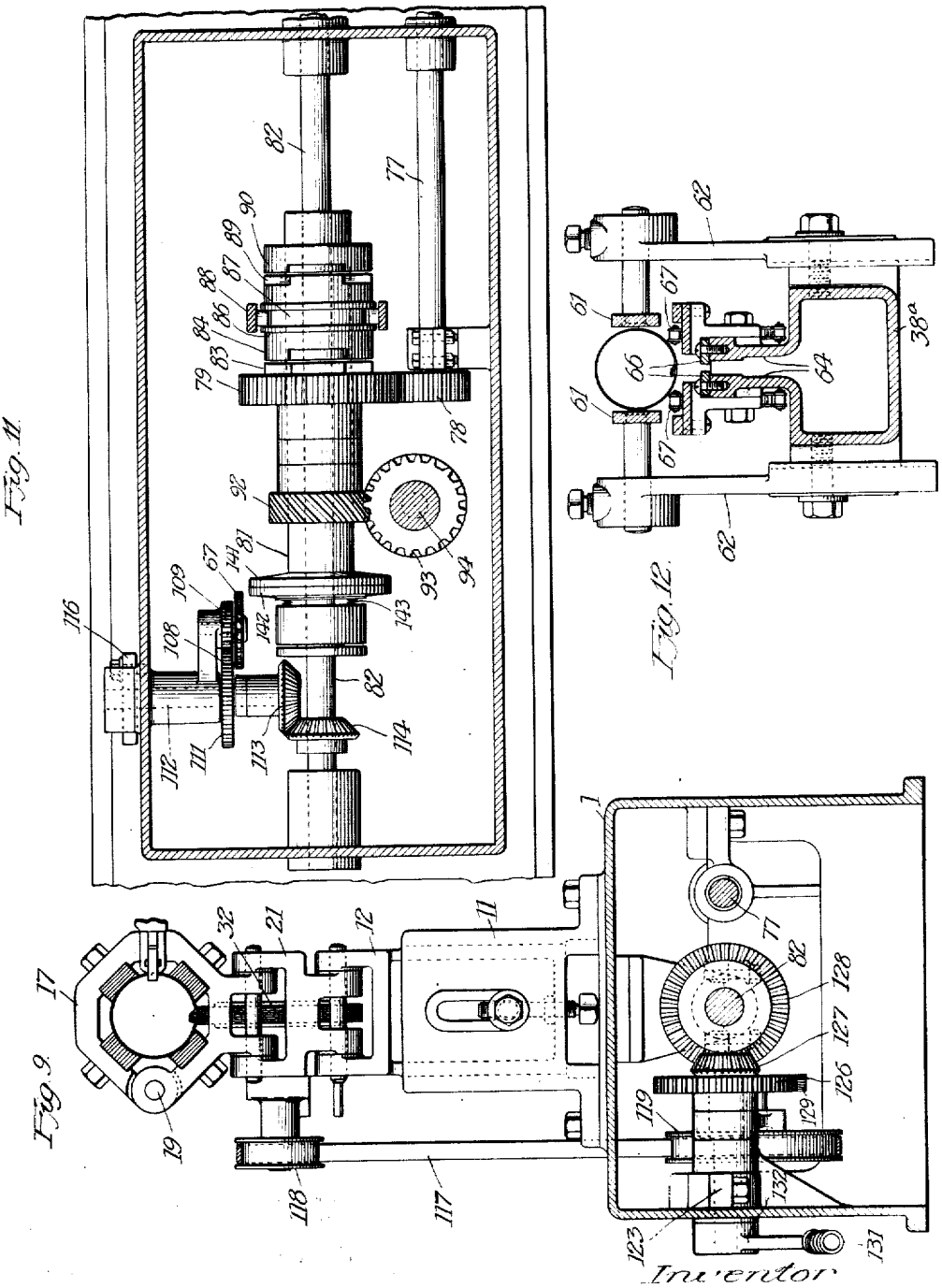

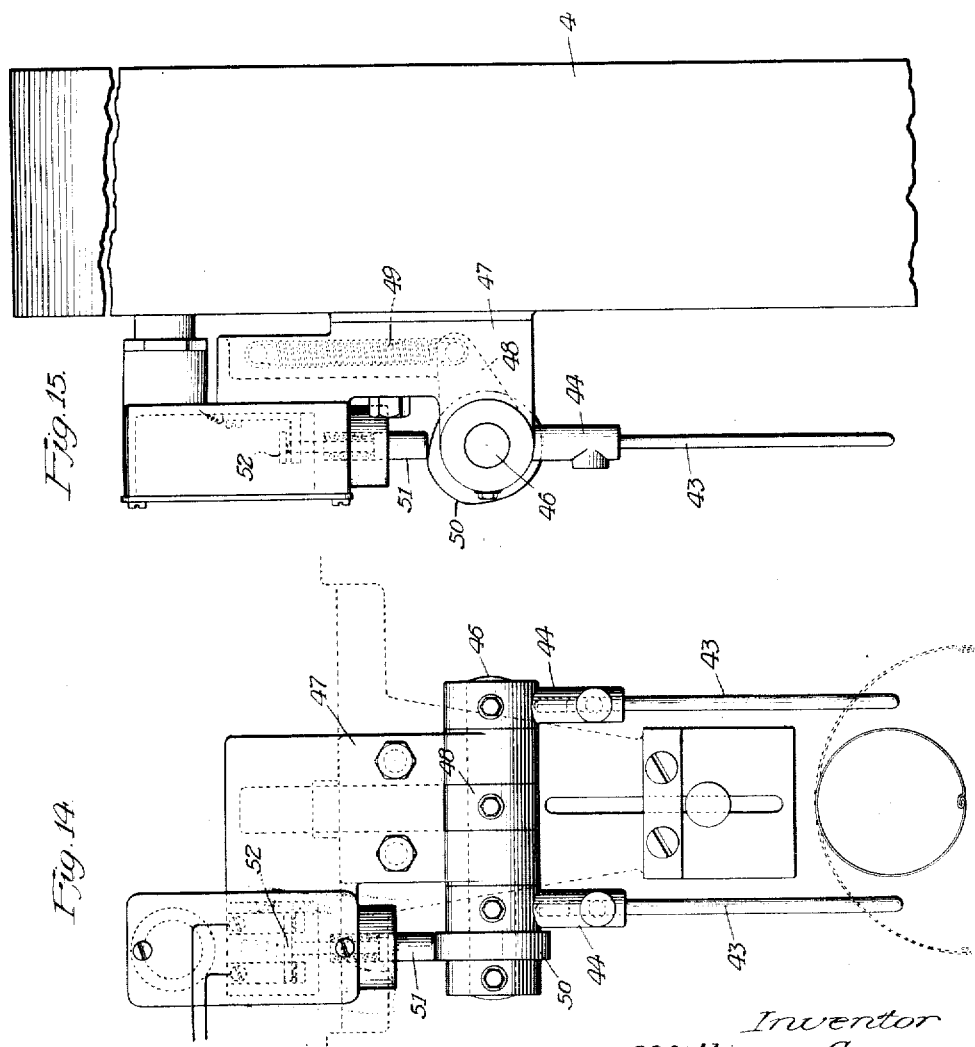

Patented Oct. 18, 1932

1,883,539

UNITED STATES PATENT OFFICE

WILLIAM CAMERON, OF CHICAGO, ILLINOIS, ASSIGNOR TO CAMERON CAN MACHINERY CO., OF CHICAGO, ILLINOIS, A CORPORATION OF ILLINOIS

SOLDERING DEVICE FOR CAN MACHINES

Application filed September 24, 1930. Serial No. 484,061.

This invention relates to can making machines and more particularly to that machine known as the body maker or lock seamer including the soldering attachment or section thereof for soldering the side seam of the body.

A complete lock seamer or body maker comprises a unit or section which forms the tin blanks into a cylindrical or otherwise shaped can body and a soldering section which solders the side seam formed upon the horn of the body maker. The can bodies are continuously conveyed through the two sections by a series of conveyors. It is apparent that the two sections must be driven in timed sequence in order that the conveyors will receive the bodies without mutilating them.

It occasionally occurs that the feed of can bodies is interrupted because of some abnormal condition such as a jam which necessitates stopping the machine either manually or automatically. It is essential that upon such an occurrence the can bodies that are in the soldering section, particularly those upon the soldering roll be carried through the machine. Otherwise those bodies would be burned by the hot roll or solder. In other words, although it may be necessary to stop the machine because of a jam, it is equally as essential that the bodies in the soldering section be conveyed through the soldering section. Furthermore, upon clearing the soldering section the latter section must be stopped and retimed relatively to the preceding section in order properly to receive bodies therefrom. The present trend toward extremely high speed machines, of course, increases the mechanical difficulties, particularly stopping, retiming and restarting the machine. It also increases the possibilities of "jams" in a machine. The latter difficulties emphasize the necessity of providing necessary limit stops to control the various sections according to conditions therein and/or in accordance with the conditions in associated sections. Increased speed also means more side seams must be soldered within a given period and accordingly usually more can bodies in the soldering section, therefore clearing of the soldering section upon stoppage of the feed of cans thereto is all the more important.

It is the purpose of this invention, therefore, to provide a high speed lock seamer in which the several operating sections are correlated and cooperatively controlled upon the occurrence of abnormal conditions in such manner as to insure proper cooperative continuation of the associated sections in proper relation upon restarting.

It is a further purpose of this invention to provide a soldering section that is fully automatic and self clearing upon stopping of the feed of bodies thereto.

In accordance with this invention means are provided for stopping the main driving motor by interrupting the current supply thereto upon the occurrence of an abnormal condition such as an unhooked body without interfering with the timed relation of the associated operating sections and without interfering with clearing the soldering section. This eliminates the engaging of clutches at high speeds and yet insures proper relation between the associated sections. The conveying means for carrying the can bodies through the soldering section is arranged to be driven from two sources of power and controlled by the occurrence of an abnormal condition in the preceding section. In other words, the conveyor of one section is controlled by the condition of the can in another section. One source of power for driving the conveyor is arranged to clear the soldering section even though the main source be stopped, and to automatically return the drive to the main source in proper timed relation.

In more detail the feeding devices such as a chain for conveying can bodies through the soldering section are arranged to be selectively driven from a plurality of sources, preferably two, one also being by preference slower than the other. The sources such as two motors are connected to the feeding means through a suitable clutch automatically operated so that upon failure of one source the second will automatically be connected to the feeding means for a certain period of time. The time is that necessary to clear the soldering section of all can bodies which have been discharged from the preceding section and entered upon the soldering section.

The control of the selection of energizing mediums for the feeding devices is preferably accomplished electrically in accordance with the condition of the source of energy normally actuating the feeding devices. Means are also provided in the controlling circuits and devices for maintaining the auxiliary drive a sufficient length of time to clear the section of can bodies and then to return the drive of the feeding devices to the normal actuating medium in proper relation for immediate resumption of operation thereby.

Other novel features of this invention reside in the construction of a horn and a support therefor for supporting can bodies while they are being conveyed through the soldering section and in the construction of the air duct and blower for cooling the can bodies after being soldered.

It is also a feature of this invention to prevent can bodies which have not been lock seamed from entering the soldering section.

Other novel features and their resulting advantages will be apparent from the following description taken in connection with the drawings in which:

Fig. 1 is a plan view of the front end of a soldering section illustrating the adjoining and connecting portion of the body forming section.

Fig. 2 is a plan view of the rear or discharge end of a soldering section.

Fig. 3 is a front elevation of the receiving end of the soldering section shown in Fig. 1.

Fig. 4 is a front elevation of the discharge end of the soldering section shown in Fig. 2.

Fig. 5 is a schematic figure illustrating the electric connections and selective drive for the main feed chain of the soldering section.

Fig. 6 is an enlarged rear elevation partly in section of the drive and clutch mechanism for actuating the feeding device.

Fig. 7 is a section on line 7—7 of Fig. 4 illustrating the vertical drive of the main feed chain.

Fig. 8 is an enlarged section on line 8—8 of Fig. 4 illustrating the drive for the blower.

Fig. 9 is an enlarged vertical section taken on line 9—9 of Fig. 3 illustrating the end support of the horn and the drive for the wiper.

Fig. 10 is a sectional detail on line 10—10 of Fig. 4.

Fig. 11 is a section on line 11—11 of Fig. 6.

Fig. 12 is a detailed view on line 12—12 of Fig. 4 illustrating a smaller can in position.

Fig. 13 is an enlarged detail of a portion of the main feeding chain.

Fig. 14 is an enlarged end elevation of the detecting device controlling the entry of can bodies to the soldering section, and Fig. 15 is an enlarged side elevation of the detecting device shown in Fig. 14.

As can be seen from the drawings, the soldering section only of the entire lock seamer is shown in detail and in the illustrated form is supported upon a frame or bed 1 which stands upon legs 2 the front legs of which are adapted to be secured to the rear end or yoke 4 of the can body forming section. The yoke end of the latter section and the main driving motor being the only elements of the can forming section illustrated the rest of the lock seamer or body maker being similar in essentials to that shown in the Odquist et al Patent 926,592 issued June 29, 1909.

As shown more or less diagrammatically in Figs. 1, 3 and 5, the can body forming section of the lock seamer is driven from a motor 6 connected to shaft 7, the latter extending beyond the end of yoke 4 and carrying upon its outer end a sprocket 8 through which certain portions of the soldering section are driven as will hereinafter be explained.

In describing the soldering section shown for purposes of illustrating this invention the operative elements will be described in the order in which a can body would be presented thereto when being conveyed through the section. The manner of operating each of the elements will then be described. This will be followed by a description of the control circuits and mechanisms for controlling the operation of the elements in proper relation and timed sequence.

Bolted to the top surface of the bed 2 at spaced intervals are two pedestals 9 and 11 to which are adjustably secured brackets 12 and 13 respectively. The latter serving to support the front section of an exterior guiding horn in a manner permitting adjustment thereof to fit varying sizes of can bodies.

The guiding horn comprises four parallel bars 14 arranged to surround the can body, the inner faces thereof being concaved to fit the outer diameter of the can body being soldered. The horn bars 14 thus serve to guide and support the can throughout their passage through the soldering section by contacting with the exterior only of the can. At each end the four bars 14 are held in position by arms 16 and 17 secured to brackets 12 and 13 respectively. The arms 16 and 17 are formed in two sections hinged upon the side as at 18 and 19 one section thereof carrying the two upper bars 14 and the other section thereof carrying the two lower bars 14. For inspection purposes and removal of the can bodies the horn may be opened by swinging the two upper bars clear upon hinges 18 and 19.

In order to accommodate for expansion of bars 14 due to heat arm 17 is pivotally secured to bracket 13 through the medium of link 21 whereas arm 16 is supported rigidly upon bracket 12. This permits longitudinal expansion of the arms 14 when they become heated. As stated before the brackets 12 and 13 are adjustable within pedestals 9 and 11, accordingly, the horn may be raised or lowered to bring it into alignment with the horn of the lock seamer and to permit adjustment for different sizes of can bodies.

That portion of the horn just described constitutes what may be termed the soldering portion. Immediately beneath the forward ends of the horn is a flux tray 22 carried by bracket 12 within which rotates a flux roll 23 arranged to dip into the flux tray and to contact with the exterior of the cans as they are passed along the horn. The flux in tray 22 is maintained at a constant level by a flux reservoir 24.

Immediately beneath the center portion of the horn is a solder pot 26 within which is rotatably mounted a solder roll 27. Pot 26 is mounted upon adjustable supports 28 by means of which the pot and roll may be raised or lowered into proper relation to the can bodies. The pot may be heated by any suitable burners supplied from the conduit 29 which may also be adjusted vertically through adjustable supports 31.

Adjacent the discharge end of the solder pot is mounted a wiper roll 32 arranged to wipe the surplus solder from the cans as they pass along the horn and to deposit the surplus solder upon a shelf 33.

Each end of the solder pot carries hinged arms 34 similar to arms 16 and 17 which further support horn bars 14.

The horn is continued in a second or cooling section which is independent of the first section. The cooling portion comprises four longitudinal bars 14a similar to 14 secured in proper position by hinged arms 36 and 37. Arms 36 are pivotally connected to bracket 13 by a link 35 similar to link 21. The arms 37 are rigidly secured to an air duct 38 which underlies the entire cooling section of the horn.

The duct is preferably cast in one piece and is enlarged at its forward end as at 39 to receive a blower 41. The duct is rectangular in cross section and is of greater depth than width as can be seen from Figs. 7, 8 and 10. The duct is formed with a narrow slot-like opening 42 in its upper wall the opening being directly under the longitudinal seam of the can body whereby a blast of air will be directed along the seam and thence along the lower portion of the can.

The can bodies are conveyed into the leading end of the horn by an extended feed bar operated from the lock seamer in the usual manner. As the can bodies are discharged from the body forming horn of the lock seamer they pass under a detector which will permit properly hooked or seamed bodies to pass along the horn and into the soldering section but will stop the machine upon encountering an unhooked or unseamed body. As a matter of convenience the detector is attached to the yoke of the lock seamer although it may be supported in any suitable manner between the two sections, that is, between the lock seamer section and soldering section.

The detector (Figs. 14 and 15) comprises a pair of parallel fingers 43 spaced apart a sufficient distance to permit the passage therebetween of a formed can body but close enough together to prevent the passage of an unhooked or unseamed body as is clearly shown in Fig. 14. The fingers 43 are secured to a pair of sockets 44 which in turn are rigidly fastened to a rock shaft 46 journalled in a bracket 47 bolted to yoke 4. Shaft 46 also carries an arm 48 which projects rearwardly of the shaft and to which is secured a spring 49 which serves to maintain the fingers in position to be engaged by the unhooked cans. A cam 50 is secured to shaft 46 to be rotated thereby and engages spring pressed plunger 51 which in turn actuates a safety switch 52. Switch 52 controls the motor of the body forming machine section and the main feed chain for conveying the cans through the soldering sections as will be hereinafter described in greater detail.

The can bodies are conveyed through the horn by feeding devices comprising a main feed chain 53 generally termed a stripper chain carrying feed dogs 54 (Fig. 13). The chain is arranged to enter between the upper and lower bars 14 and 14a at a point opposite the hinge 18 and to engage the sides of the can bodies. The chain is mounted over two sprockets 56 and 57 journalled in a horizontal plane about vertical axes.

From the horn members 14a the can bodies are discharged onto what may be termed a second cooling section by releasing arms 59. Arms 59 rotate with sprocket 57 and project beyond the latter in order to engage the can bodies and disengage them from dogs 54.

The can bodies are deposited by the arms 59 upon a pair of adjustable spaced rails 61 the latter being horizontally adjustably mounted in arms 62 which in turn are vertically adjustably secured to the end section 38a of the air duct 38. The duct section 38a is preferably cast in one piece and is secured at one end to the duct 38 and is adjustably supported intermediate its ends upon a pedestal 63 bolted to bed 1.

The duct 38a is also rectangular in cross section and the depth thereof decreases throughout its length. The top wall of the duct is extended upwardly by a pair of parallel opposed flanges 64 which terminate in a restricted opening facing the bottom of the can bodies. Plates 66 are adjustably secured to the upper edge of the flanges 64 whereby the width of the opening in the top of the duct may be adjusted.

The can bodies are conveyed along rails 61 by a pair of conveyor chains 67 disposed to engage the can body below and to each side of the seam formed therein. The conveyor chains pass over sprockets 68 and 69 journalled upon shafts secured to the air duct 38a by brackets 71 and 72 respectively the brackets 72 being secured in such a manner that they may be adjusted to maintain the two chains taut. The feed chains 67 deposit the formed, soldered and cooled can bodies upon an inclined slide 73 secured to the discharge end of duct 38a which directs the can bodies to the succeeding element or section in the series of can making machines.

Having described the travel of the can bodies through the various elements constituting the soldering section, the operating mechanisms for actuating the various elements and feeding devices will now be described.

In operation the conveyor chains and particularly stripper chain 53 which receives can bodies from the body making section should be operated in timed sequence relatively to the lock seamer whereby the dogs 54 on chain 53 will be in position to engage the rear end of a can as it is ejected from the lock seamer section. Accordingly it is preferable to normally drive feed chain 53 from the motor which actuates the body making section as is done in the machine illustrating this invention.

For this purpose the projecting end of the body making section drive shaft 7 is connected by a chain 76 to one drive shaft 77 of the soldering section the chain engaging sprocket 8 on shaft 7 and a sprocket 78 upon the end of shaft 77. The drive from shaft 77 to the feed chain 54 is best shown in Figs. 3, 4, 5, 6, 7, and 11 it being borne in mind that Figs. 6 and 7 are views from the rear side of the machine, that is, the side opposite to that shown in Figs. 3, 4 and 5. Shaft 77 has secured to the opposite end thereof a spur gear 80 which engages a gear 79 journalled upon a sleeve 81 rotatable on a second relatively slower drive shaft 82. The gear 79 has secured to or formed integrally upon one face thereof one element 83 of a clutch member. The other element 84 of the clutch member being formed upon a collar 86 slidably but non-rotatably secured to sleeve 81. The collar 86 is provided with an annular groove 87 adapted to be engaged by a clutch yoke upon the end of throw-out lever 88. Collar 86 is also provided with a second clutch element 89 engageable with the complementary clutch member 90 rigidly secured to shaft 82. It follows from the above that sleeve 81 will be driven from either shaft 77 or shaft 82 in accordance with the position of collar 86 the position of the latter being determined by the clutch throw-out lever 88.

In this connection it should be pointed out that shaft 82 is rotating at a much slower speed than shaft 77 therefore engagement of clutch elements 89 and 90 may take place much more readily without any damage thereto. In practice it has been found very satisfactory to drive the machine at a normal speed equivalent to 300 cans per minute and to drive shaft 82 at a speed equivalent to 150 cans per minute. The normal drive is of course from shaft 77 the clutch elements 84 and 83 being normally held in engagement by a spring 91 acting upon lever 88.

Sleeve 81 also carries a gear 92 which engages with a gear 93 upon vertical shaft 94. The latter shaft extends upwardly through the universal joint 96 and drives sprocket 57 and thereby feed chain 53. The feed chain 53 is accordingly selectively driven from either shaft 77 or shaft 82. As has been previously stated shaft 77 is the normal drive and is operated from the lock seamer motor 6. The control and operating mechanism for shifting lever 88 will be described hereinafter.

The other mechanisms of the soldering section including the blower, the solder roll, the feed chains 67 and the wiper, are all actuated from shaft 82 which is driven by a separate motor 97 through a silent chain 98 which passes over a sprocket 99 on shaft 101 (Fig. 8). Between sprocket 99 and shaft 101 is inserted a main ball friction clutch 102 arranged to slip should the load become excessive from any trouble occuring in any of the above mechanisms such as would be the case should the solder and roll be cold and stuck. Shaft 101 has a worm 103 keyed thereto which engages a worm wheel 104 on shaft 82. Shaft 101 is also provided with a handwheel 106 for manual operation.

The blower 41 is driven directly from a pulley on motor 97 and belt 107.

The conveyor chains 67 are driven by a chain 108 (Figs. 6, 4, 10, 11) which passes over a sprocket 109 secured to sprocket 68 and over sprocket 111 keyed to shaft 112 which carries upon one end a bevel gear 113 engaging a bevel gear 114 upon shaft 82. The outer end of shaft 112 is provided with a slotted arm 116 by means of which the tension of the chain may be adjusted.

The wiper 32 is driven by a belt 117 which passes over a pulley 118 on the wiper shaft and a pulley 119 journalled upon a stub shaft 121 carried by an arm 122 secured to a rock shaft 123. Shaft 121 also carries a sprocket 124 in alignment with a sprocket 126 journalled on shaft 123. Sprocket 126 is formed integrally and with a bevel gear 127 which engages a bevel gear 128 upon shaft 82. Chain 129 connects sprockets 126 and 124 whereby belt 117 and wiper roll 32 is driven from shaft 82. The proper tension is maintained upon belt 117 by means of a spring 131 acting upon an arm 132 secured to shaft 123.

The solder roll 27 is also driven from shaft 82 by means of a chain 133 and a slip clutch comprising a fixed element 134 journalled on shaft 82 and a yieldable element 136 slidably but non-rotatably carried by shaft 82. Element 136 is urged into engagement with element 134 by a spring 137. A shift lever 138 is employed to control the solder roll clutch. Lever 138 may be latched to maintain the clutch disengaged by a latch 139 when desired such as when the solder roll is cold. If the operator fails to disengage the clutch members 134 and 136 and attempts to start the machine with the solder pot and roll cold, the latter clutch members will slip, thus preventing undue strain on the driving element. Should the latter clutch members fail to function the main slip clutch 102 will function and accordingly prevent serious damage.

In order to insure reengagement of the clutch elements 84 and 83 in proper relation sleeve 86 is maintained in constant driving relation with shaft 82 through a slip clutch having one element 141 secured to sleeve 86 and the other element 142 rigidly connected to shaft 82 for rotation therewith the two elements being frictionally urged together by springs 143.

Having described the essential parts of the machine and their actuating mediums the electrical circuits and associated elements for controlling the driving motors and selective stripper chain clutch will now be described with particular reference to Fig. 5, in which the circuit is shown in normal inoperative position in full lines and in operative or running condition in dotted lines.

The main motor 6 for normally driving the body making and soldering sections receives its current from the line L and through a main switch 146, one conductor 147 leading directly to motor 6 through a switch 148 and the other conductor 149 being carried through a pair of contacts 151 controlled by a relay 152 and then through switch 148 to the motor. Relay 152 is actuated by a control circuit including a source of current 153 which is connected to the relay through a starting switch 154, a stopping switch 156, safety switch 52 and a series of other similar safety switches 157 the latter being positioned at different points throughout the body maker section. A holding circuit for maintaining relay 152 energized after initial energization by pressing the starting button is provided and includes a conductor 158, contacts 159 and a conductor 161. Upon closing of the relay contacts 159 will be closed and will establish a holding circuit for the relay regardless of the starting switch 154.

Relay 152 also controls the operation of clutch lever 88. For this purpose relay 152 controls a pair of back contacts 162 which latter contacts when closed connect a source of current 163 through a circuit 164 to a recond relay 165 the latter relay being a slow acting relay controlled by a dash pot 166. Relay 165 in turn actuates a switch 167 which serves to connect the source of current 163 to a third relay 168 through a circuit 169. Relay 168 in turn actuates a pair of switch contacts 171 which latter contacts control the energization of a solenoid 172 mechanically connected to lever 88 for actuating the same against spring 91 through a circuit 173.

The motor 97 is connected directly across the line through a switch 174.

The operation and control of the various elements is believed to be obvious from the foregoing description particularly to one skilled in the art and will therefore be but briefly summarized.

The entire lock seamer having been put in operation by closing the necessary switches and depressing starting switch 154 the motor 6 will operate and drive shaft 77 through chain 76. Shaft 77 will drive feed chain 53 through gears 78 and 79, sleeve 81, and gears 92 and 94. As previously stated spring 91 acting upon lever 88 will maintain clutch elements 83 and 84 in engagement. The other elements of the soldering section will be driven through motor 97. It will be borne in mind that during operation of chain 53 from shaft 77 clutch elements 141 and 142 will slip permitting rotation of shaft 82 independently of sleeve 81.

Should the lock seamer be stopped by reason of operation of one of the safety switches relay 152 will drop opening contacts 151 and closing contacts 162. The closing of contacts 162 will energize relay 165 which in turn will make a sliding connection with contact 167. The period of contact will depend upon the adjustment of the dash pot 166. During the period that contact 167 is closed relay 168 will be energized through circuit 169. The closing of relay 168 will close contacts 171 which will energize solenoid 172 through circuit 173. The energizing of solenoid 172 will throw clutch lever 88 against the action of spring 91 to close the clutch elements 89 and 90. Thus while contact 167 is engaged solenoid 172 will hold clutch elements 89 and 90 in contact and sleeve 81 will be driven from shaft 82 and motor 97.

At the end of its movement relay 165 will leave contact 167, the period of engagement of contact 167 being timed to clear the soldering section of all can bodies, thus releasing relay 168 which in turn will disconnect solenoid 172 from the line and permit spring 91 to rotate clutch lever 88 and bring clutch elements 83 and 84 into engagement. If the clutch members 83 and 84 are not in proper position to interlock with each other, shaft 82 will rotate sleeve 81 and clutch member 83 through clutch members 141 and 142 until the two clutch members 83 and 84 become interlocked after which clutch members 141 and 142 will slip.

It follows from the above that a high speed lock seamer including a soldering attachment or section has been provided which is particularly well adapted to be inserted as an element in a series of high speed machines for making can bodies. The can conveying mechanism is arranged to be selectively driven from either of two sources of energy which are so inter-related and controlled that although the section is particularly well adapted to be a part of a fully automatic system having limiting switches throughout since the soldering section will clear itself of all can bodies thereon even though the rest of the elements in the system or complete machine be stopped. The conveying means is also so constructed and arranged that it will also finally be stopped should the rest of the machine be idle after the soldering section has been cleared and emptied of all can bodies thereon. The operating mechanism for the conveyors is arranged to be restored to the normal operative condition and relation after the cans have been cleared.

The novel arrangement of exterior horn and air duct permit of high speed operation and yet give complete accessibility to the cans at any time during their passage through the machine. The entry of improperly formed can bodies is prevented by the initial detecting mechanism which further serves to prevent damage to the machine resulting in long periods of inoperation.

It is obvious that many changes may be made in the details of construction without departing from the spirit and scope of the invention as defined in the claims appended hereto.

I claim:

1. In a can making machine, a body forming section, a soldering section arranged to receive can bodies from the forming section, feeding devices for conveying the can bodies over the soldering roll of said soldering section, a motor for actuating said feeding devices in timed relation to the forming section, an independent motor for actuating said feeding devices upon cessation of said first mention motor and means for automatically and selectively connecting said feeding devices in predetermined order to said motors.

2. In a can making machine, a body forming section, a soldering section arranged to receive can bodies from the forming section, feeding devices for conveying the can bodies to and from the soldering devices of said soldering section, a motor for actuating said feeding devices in timed relation to the forming section, an independent motor for actuating said feeding devices and means for automatically connecting said feeding devices to said second motor for a predetermined period upon cessation of said first mentioned motor.

3. In a can making machine, a body forming section, a soldering section arranged to receive can bodies from the forming section, feeding devices for conveying the can bodies to and from the soldering devices of the soldering section, a motor for actuating said feeding devices in timed relation to the forming section, an independent motor means for automatically connecting said feeding devices to said latter motor a predetermined period upon cessation of said first mentioned motor, and means for automatically reconnecting the feeding devices to said first motor for operation thereby in proper relation to said forming section.

4. In a can making machine, a body forming section, a motor for actuating the same, a soldering section, feeding means for conveying the formed can bodies to and from the soldering devices of the soldering section in timed relation to the forming section, a second motor and connections for automatically driving said feeding means from either of said motors under predetermined conditions and means for determining the period of drive from one of said motors.

5. A can soldering section comprising soldering devices, a feeding device for conveying can bodies into and from the soldering devices and a plurality of independently operable motors, driving connections for selectively actuating said feeding devices from either of said motors comprising a shaft driven by one of said motors a second shaft driven from the other of said motors and a clutch for selectively connecting said feeding devices to either of said shafts.

6. A can soldering section comprising soldering devices, a feeding device for conveying can bodies into and from the soldering devices, a plurality of motors and driving connections for actuating said feeding devices from either of said motors comprising a shaft driven by one of said motors, a second shaft driven from the other of said motors and a clutch for selectively connecting said feeding devices to either of said shafts, said clutch being arranged to normally drive said feeding devices from one of said shafts and a friction clutch between the other of said shafts and the feeding devices.

7. A can soldering section comprising soldering devices, a feeding device for conveying can bodies into and from the soldering devices, a plurality of motors, and driving connections for actuating said feeding devices from either of said motors comprising a shaft driven by one of said motors, a second shaft driven from the other of said motors and a clutch for selectively connecting said feeding devices to either of said shafts, said clutch being arranged to normally drive said feeding devices from one of said shafts and a friction clutch between the other of said shafts and the feeding devices, said friction clutch being normally engaged.

8. A can soldering section comprising soldering devices, a feeding device for conveying can bodies into and from the soldering devices, a plurality of independently operable motors, and driving connections for actuating said feeding devices from either of said motors comprising a shaft driven by one of said motors, a second shaft driven from the other of said motors, a sleeve journaled upon one of said shafts, said sleeve being operatively connected to said feeding device, and a clutch for selectively connecting said sleeve to either of said shafts.

9. A can soldering section comprising soldering devices, a feeding device for conveying can bodies into and from the soldering devices, a pair of motors and driving connections for actuating said feeding devices from either of said motors comprising a shaft driven by one of said motors, a second shaft driven from the other of said motors, a sleeve journaled upon one of said shafts, said sleeve being operatively connected to said feeding device and a clutch for selectively connecting said sleeve to either of said shafts, said clutch being normally engaged with one of said shafts and the other of said shafts being normally yieldingly engaged by said sleeve.

10. A can soldering section comprising soldering devices, a feeding device for conveying can bodies into and from the soldering devices, a pair of motors arranged to run at different speeds and driving connections for actuating said feeding devices from either of said motors comprising a shaft driven by one of said motors, a second shaft driven from the other of said motors, a sleeve journaled upon one of said shafts, said sleeve being operatively connected to said feeding device and a clutch for selectively connecting said sleeve to either of said shafts, said clutch being normally engaged with the higher speed shaft and the other of said shafts being normally yieldingly engaged by said sleeve.

11. A can soldering section comprising soldering devices, a feeding device for conveying can bodies into and from the soldering devices and a pair of motors, driving connections for selectively actuating said feeding devices from either of said motors comprising a shaft driven by one of said motors, a second shaft driven from the other of said motors, a clutch for selectively connecting said feeding devices to either of said shafts and means for controlling said clutch in response to the current supply to one of said motors.

12. A can soldering section comprising soldering devices, a feeding device for conveying can bodies into and from the soldering devices and a pair of motors, both said motors being normally running when said machine is in operation, driving connections for automatically selectively actuating said feeding devices, from either of said motors comprising a shaft driven by one of said motors, a second shaft driven from the other of said motors, a clutch for selectively connecting said feeding devices to either of said shafts, and means for automatically reversing said clutch upon cessation of one of said motors.

13. In a can making machine, a body forming section, a body soldering section, a feed chain for conveying can bodies through the soldering section in timed relation to the forming mechanisms, an electric motor for actuating the body forming mechanisms, a circuit for supplying electric current to said motor, a motor for actuating the soldering mechanisms, and selective driving connections from each of said motors to said feed chain, the selection of said connections being controlled by the condition of said circuit.

14. In a can making machine, a body forming section, a body soldering section, a feed chain for conveying can bodies through the soldering section in timed relation to the forming mechanisms, an electric motor for actuating the body forming mechanisms, a circuit for supplying electric current to said motor, a motor for actuating the soldering mechanisms, and selective driving connections from each of said motors to said feed chain, the selection of said connections being automatically controlled by the condition of said circuit and including a clutch to operatively connect said chain to either of said motors.

15. In a can making machine, a body forming section, a body soldering section, a feed chain for conveying can bodies through the soldering section in timed relation to the forming section, an electric motor for actuating the body forming section, a circuit for supplying electric current to said motor, a motor for actuating the soldering mechanisms, selective driving connections from each of said motors to said feed chain, said connections including a clutch to operatively connect said chain to either of said motors and arranged normally to connect said chain to said first mentioned motor and means for controlling said clutch in accordance with the condition of said circuit to connect said chain to said second motor.

16. In a can making machine, a body forming section, a body soldering section, a feed chain for conveying can bodies through the soldering section in timed relation to the forming section, an electric motor for actuating the body forming section, a circuit for supplying electric current to said motor, a motor for actuating the soldering section, selective driving connections from each of said motors to said feed chain, said connections including a clutch to operatively connect said chain to either of said motors and arranged normally to connect said chain to said first mentioned motor and means for controlling said clutch in accordance with the condition of said circuit to connect said chain to said second motor for a predetermined period of time.

17. In a can making machine, a body forming section, a body soldering section, a feed chain for conveying can bodies through the soldering section in timed relation to the forming section, an electric motor for actuating the body forming section, a circuit for supplying electric current to said motor, a motor for actuating the soldering section, selective driving connections to connect each of said motors to said feed chain, said connections including a clutch to operatively connect said chain to either of said motors and arranged normally to connect said chain to said first mentioned motor, means for controlling said clutch in accordance with the condition of said circuit to connect said chain to said second motor for a predetermined period of time and means for restoring said clutch to normal position.

18. In a can making machine, a body forming section, a soldering section, a feed chain for receiving can bodies from said forming section and conveying them through said soldering section, an electric motor for actuating the mechanisms of said forming section, a control circuit for said motor, a second electric motor, a clutch for operatively connecting said second motor to said chain at certain periods, and means for controlling said clutch including a circuit controlled by said control circuit.

19. In a can making machine, a body forming section, a soldering section, a feed chain for receiving can bodies from said forming section and conveying them through said soldering section, an electric motor for actuating the mechanisms of said forming section, a control circuit for said motor, a second electric motor, a clutch for operatively connecting said second motor to said chain at certain periods, and means for controlling said clutch including a circuit controlled by said control circuit, said clutch circuit also including means for delaying the action of said clutch.

20. In a can making machine, a body forming section, a soldering section, a feed chain for receiving can bodies from said forming section and conveying them through said soldering section, an electric motor for actuating the mechanisms of said forming section, a control circuit for said motor, a second electric motor, a clutch for operatively connecting said second motor to said chain at certain periods, and means for controlling said clutch including a circuit controlled by said control circuit, said clutch circuit also including a circuit for delaying the action of said clutch.

21. In a can body making machine, a body forming section, a motor for actuating the same, a soldering section, feeding means for conveying the formed cans to and from the soldering devices of the soldering section in timed relation to the forming section, a second motor, a clutch for driving said feeding means from either of said motors and a magnetic device for controlling said clutch.

22. In a can body soldering section, an exterior horn for supporting a series of can bodies, feeding means for conveying can bodies through said horn, a soldering roll underlying said horn and an air duct having a restricted longitudinal opening disposed adjacent said horn and arranged to direct a blast of air on the can bodies.

23. In a can body soldering section, an exterior horn for supporting a series of can bodies, feeding means for conveying can bodies through said horn, a soldering roll underlying said horn and an air duct having a restricted longitudinal opening disposed adjacent said horn and arranged to direct a blast of air on the can bodies, said duct being gradually flattened in cross section from its intake end to its remote end.

24. In a can body soldering section, an exterior horn for supporting a series of can bodies, feeding means for conveying can bodies through said horn, a soldering roll underlying said horn and an air duct having a restricted longitudinal opening disposed adjacent said horn and arranged to direct a blast of air on the cans, said duct being enlarged at one end to receive a blower.

25. In a can body soldering section, a frame, a can body supporting and guiding horn comprising a plurality of parallel members adapted to engage the exteriors of can bodies, arms engaging and positioning said members, said arms all being hinged upon one side intermediate the top and bottom members to permit separation thereof and feeding devices for conveying can bodies through the horn.

26. In a can body soldering section, a frame, a can body supporting and guiding horn comprising a plurality of parallel members adapted to engage the exteriors of can bodies, means for rigidly supporting one end of said horn and yieldable means for supporting the other end of said horn, said latter means permitting longitudinal movement of said horn.

27. In a can body soldering section, a frame, a can body supporting and guiding horn comprising a plurality of parallel members adapted to engage the exteriors of can bodies, means for rigidly supporting one end of said horn and means for yieldingly supporting the other end of said horn comprising a pivoted member arranged to permit expansion of said horn.

28. In a can body soldering section, a frame, a can body supporting and guiding horn comprising a plurality of parallel members adapted to engage the exteriors of can bodies, means for rigidly supporting one end of said horn and means for yieldingly supporting the other end of said horn comprising a link arranged to permit expansion of said horn.

29. In a can body soldering section, a frame, a can body supporting and guiding horn adapted to engage the exteriors of can bodies to guide them through the machine, feeding devices for conveying the can bodies through said horn and means at the entrance of said horn and in the path of can bodies for stopping the machine upon engagement with an unseamed can body.

30. In a can body soldering section, a frame, a can body supporting and guiding horn adapted to engage the exteriors of can bodies to guide them through the machine, feeding devices for conveying the can bodies through said horn and means at the entrance of said horn and in the path of can bodies for stopping the machine upon engagement with an unseamed can body, said latter means comprising a pair of spaced fingers projecting into the path of movement of the can bodies and arranged to engage an unseamed can body.

31. In a can body soldering section, a frame, a can body supporting and guiding horn adapted to engage the exteriors of can bodies to guide them through the machine, feeding devices for conveying the can bodies through said horn and means at the entrance of said horn and in the path of can bodies for stopping the machine upon engagement with an unseamed can body, said latter means comprising a pair of pivoted fingers spaced to permit the passage of a seamed can body but to intercept the passage of an unseamed can body.

32. In a can body soldering section, a frame, a can body supporting and guiding horn adapted to engage the exteriors of can bodies to guide them through the machine, feeding devices for conveying the can bodies through said horn and means at the entrance of said horn and in the path of can bodies for stopping the machine upon engagement with an unseamed can body, said latter means comprising a pair of pivoted fingers spaced to permit the passage of a seamed can body but to intercept the passage of an unseamed can body and a control switch operated by said fingers.

33. In a can making machine, a body forming section, a body soldering section, a feed chain for conveying can bodies through the soldering section in timed relation to the forming mechanisms, an electric motor for actuating the body forming mechanisms, a circuit for supplying electric current to said motor and means responsive to the occurrence of an abnormal condition to open the circuit to said driving motor.

34. In a can making machine, a body forming section, a body soldering section, a feed chain for conveying can bodies through the soldering section in timed relation to the forming mechanisms, an electric motor for actuating the body forming mechanisms, a circuit for supplying electric current to said motor and means responsive to the occurrence of an abnormal condition to open the circuit to said driving motor without interrupting the feed of can bodies through the soldering section.

35. In a can making machine, a body forming section, a body soldering section, a feed chain for conveying can bodies through the soldering section in timed relation to the forming mechanisms, an electric motor for actuating the body forming mechanisms, a circuit for supplying electric current to said motor and means responsive to the occurrence of an abnormal condition to open the circuit to said driving motor and means for clearing the soldering section after opening of said circuit.

36. In a can making machine, a body forming section, a body soldering section, a feed chain for conveying can bodies through the soldering section in timed relation to the forming mechanisms, an electric motor for actuating the body forming mechanisms, a circuit for supplying electric current to said motor, a motor for actuating the soldering mechanisms, selective driving connections from each of said motors to said feed chain, and means responsive to the occurrence of an abnormal condition to open the circuit to said first motor.

37. In a can making machine, a section having mechanisms for performing operations upon a blank to partially form a can therefrom, a second section operatively associated with said first section for performing additional operations upon said blank to further complete a can therefrom and means responsive to the condition of the blank in one section for controlling the operation of the other section.

38. In a can making machine, a section having mechanisms for performing operations upon a blank to partially form a can therefrom, a second section operatively associated with said first section for performing additional operations upon said blank to further complete a can therefrom and means responsive to the condition of the blank as it is discharged from one section for controlling the operation of the other section.

39. In a can making machine, a section having mechanisms for performing operations upon a blank to partially form a can therefrom, a second section operatively associated with said first section for performing additional operations upon said blank to further complete a can therefrom and means responsive to the condition of the blank as it is discharged from the first section for controlling the succeeding section.

40. In a can making machine, a section having mechanisms for performing operations upon a blank to partially form a can therefrom, a second section operatively associated with said first section for performing additional operations upon said blank to further complete a can therefrom and means responsive to the condition of the blank in one section for stopping one section independently of the other section.

41. In a can making machine, a section having mechanisms for performing operations upon a blank to partially form a can therefrom, a second section operatively associated with said first section for performing additional operations upon said blank to further complete a can therefrom and means responsive to the condition of the blank in one section for stopping each section in predetermined order.

42. In a can making machine, a section having mechanisms for performing operations upon a blank to partially form a can therefrom, a second section operatively associated with said first section for performing additional operations upon said blank to further complete a can therefrom and means responsive to the condition of the blank in one section for stopping one section immediately and the other section after a predetermined period.

43. In a can making machine a section having mechanisms for performing operations upon a blank to partially form a can therefrom, a second section operatively associated with said first section for performing additional operations upon said blank to further complete a can therefrom and means responsive to the condition of the blank in one section for stopping the first section immediately and the succeeding section after a predetermined period.

44. In a can making machine, a section having mechanisms for performing operations upon a blank to partially form a can therefrom, a second section operatively associated with said first section for performing additional operations upon said blank to further complete a can therefrom and means operative upon failure of one section to function properly to stop both sections.

45. In a can making machine, a section having mechanisms for performing operations upon a blank to partially form a can therefrom, a second section operatively associated with said first section for performing additional operations upon said blank to further complete a can therefrom and means operative upon failure of one section to function properly to stop both sections in predetermined order.

46. A can body soldering section comprising a soldering roll, a feeding device for conveying can bodies over said soldering roll, a main driving motor for normally driving said device, an auxiliary motor for selectively actuating said feeding device and means automatically operable to selectively connect said device to either motor in predetermined sequence.

47. A can body soldering section comprising a soldering roll, a feeding device for conveying can bodies over said soldering roll, a main driving motor for normally driving said device, an auxiliary motor operating at a slower speed than said main motor for selectively actuating said feeding device and means automatically operable to selectively connect said device to either motor in predetermined sequence.

48. In a can making machine, a body forming section, a soldering section arranged to receive can bodies from the forming section, feeding devices for conveying the can bodies to and from the soldering devices of the soldering section, means for actuating said forming section and said feeding devices in timed relation, independent means for automatically actuating said feeding devices for a predetermined period upon cessation of said first mentioned means and means for automatically reconnecting said feeding device to said first driving means in proper timed relation thereto.

49. In a can body making machine, a body forming section, a motor for actuating the same, a soldering section, feeding means for conveying the formed can bodies to and from the soldering devices of said soldering section, a motor for driving said devices in timed relation to the forming section, a second motor for operating certain elements of the soldering section and connections for automatically connecting said feeding means to be driven alternately from either of said motors under predetermined conditions.

50. In a can making machine, a body forming section, a motor for actuating the same, a soldering section, feeding means normally driven from said motor for conveying the formed can bodies to and from the soldering devices of said soldering section in timed relation to the forming section, an independent motor for actuating the soldering devices and connections for automatically selectively driving said feeding devices from said latter motor upon failure of said first motor.

51. In a machine for making and soldering can bodies, a can soldering section arranged to receive can bodies from the making section, feeding devices for conveying the can bodies over the soldering roll of the soldering section, driving means for normally actuating said devices in timed relation to the discharge of can bodies from the body making section and means automatically responsive to failure of said normal driving means to continue the action of said feeding devices a sufficient period to clear the soldering roll of can bodies and reconnect the normal drive in timed relation to the body making section upon clearing of said soldering roll.

52. In a machine for making and soldering can bodies, a can soldering section arranged to receive can bodies from the making section, feeding devices for conveying the can bodies over the soldering roll of the soldering section, driving means for normally actuating said devices in timed relation to the discharge of can bodies from the body making section, an independent drive for actuating said devices and means automatically operable upon failure of said normal driving means to connect said independent driving means to said devices a sufficient period to clear the soldering roll of can bodies.

53. In a machine for making and soldering can bodies, a can soldering section arranged to receive can bodies from the making section, feeding devices for conveying the can bodies over the soldering roll of the soldering section, driving means for normally actuating said feeding devices in timed relation to the discharge of can bodies from the body making section, means for continuing the action of said feeding devices upon failure of said normal drive, and means actuated by failure of said normal driving means to set said continuing means in operation a sufficient period to clear the soldering roll of can bodies.

In witness of the foregoing I affix my signature.

WILLIAM CAMERON.

CERTIFICATE OF CORRECTION.

Patent No. 1,883,539.   October 18, 1932.

WILLIAM CAMERON.

It is hereby certified that error appears in the printed specification of the above numbered patent requiring correction as follows: Page 2, line 78, after "1909." insert the words "This type of lock seamer is well understood by those skilled in the art."; page 5, line 67, for "recond" read "second"; page 6, line 51, claim 1, for "mention" read "mentioned"; and line 74, claim 3, after "motor" insert a "comma"; and that the said Letters Patent should be read with these corrections therein that the same may conform to the record of the case in the Patent Office.

Signed and sealed this 20th day of December A. D. 1932.

(Seal)

M. J. Moore,
Acting Commissioner of Patents.

said devices in timed relation to the discharge of can bodies from the body making section and means automatically responsive to failure of said normal driving means to continue the action of said feeding devices a sufficient period to clear the soldering roll of can bodies and reconnect the normal drive in timed relation to the body making section upon clearing of said soldering roll.

52. In a machine for making and soldering can bodies, a can soldering section arranged to receive can bodies from the making section, feeding devices for conveying the can bodies over the soldering roll of the soldering section, driving means for normally actuating said devices in timed relation to the discharge of can bodies from the body making section, an independent drive for actuating said devices and means automatically operable upon failure of said normal driving means to connect said independent driving means to said devices a sufficient period to clear the soldering roll of can bodies.

53. In a machine for making and soldering can bodies, a can soldering section arranged to receive can bodies from the making section, feeding devices for conveying the can bodies over the soldering roll of the soldering section, driving means for normally actuating said feeding devices in timed relation to the discharge of can bodies from the body making section, means for continuing the action of said feeding devices upon failure of said normal drive, and means actuated by failure of said normal driving means to set said continuing means in operation a sufficient period to clear the soldering roll of can bodies.

In witness of the foregoing I affix my signature.

WILLIAM CAMERON.

CERTIFICATE OF CORRECTION.

Patent No. 1,883,539.　　　　　　　　　　　　　　October 18, 1932.

WILLIAM CAMERON.

It is hereby certified that error appears in the printed specification of the above numbered patent requiring correction as follows: Page 2, line 78, after "1909." insert the words "This type of lock seamer is well understood by those skilled in the art."; page 5, line 67, for "recond" read "second"; page 6, line 51, claim 1, for "mention" read "mentioned"; and line 74, claim 3, after "motor" insert a "comma"; and that the said Letters Patent should be read with these corrections therein that the same may conform to the record of the case in the Patent Office.

Signed and sealed this 20th day of December A. D. 1932.

(Seal)

M. J. Moore,
Acting Commissioner of Patents.

CERTIFICATE OF CORRECTION.

Patent No. 1,883,539. October 18, 1932.

WILLIAM CAMERON.

It is hereby certified that error appears in the printed specification of the above numbered patent requiring correction as follows: Page 2, line 78, after "1909." insert the words ' This type of lock seamer is well understood by those skilled in the art."; page 5, line 67, for "recond" read "second"; page 6, line 51, claim 1, for "mention" read "mentioned"; and line 74, claim 3, after "motor" insert a "comma"; and that the said Letters Patent should be read with these corrections therein that the same may conform to the record of the case in the Patent Office.

Signed and sealed this 20th day of December A. D. 1932.

(Seal)

M. J. Moore,
Acting Commissioner of Patents.